Feb. 20, 1968   H. E. THOMASON   3,369,541

HEAT STORAGE

Filed Oct. 22, 1965

INVENTOR

Harry E. Thomason

United States Patent Office 3,369,541
Patented Feb. 20, 1968

3,369,541
HEAT STORAGE
Harry E. Thomason, District Heights, Md.
(6802 Walker Mill Road SE., Washington, D.C. 20027)
Filed Oct. 22, 1965, Ser. No. 501,969
14 Claims. (Cl. 126—400)

ABSTRACT OF THE DISCLOSURE

Heat is stored in water in a tank in a heat storage bin. The water may be heated by solar energy, or cooled for use in air conditioning a building. The bin in FIG. 1 contains stones and building blocks forming the tank. Air to be heated is circulated under and around the warm tank and stones.

In FIG. 2 the heat storage bin is of a "pancake" design and is located beneath the floor of an A-frame building. Air to be heated may be circulated above the closed warmed water tank (during winter), or air to be cooled may be circulated below the water tank when the water therein is chilled (during summer).

---

The present invention relates to apparatus for storage of heat and finds particular utility in storage of solar-produced heat. Such stored heat can then be used, for example, to heat homes or other buildings when the sun is or is not shining. Such heating is commonly referred to as space heating.

The present apparatus is simple and low-cost in construction. The materials are permanent and non-corrosive in nature. In the "pancake" design the invention is usable in a building with no basement. Excavation costs are minimized. Large quantities of heat can be stored. If desired the water or other liquid can be chilled during hot weather to air-condition the building.

The storage apparatus may be used to store heat or "coolness," that is, to store heat at a temperature level higher or lower than the level where it is to be used. For example, if a house is to be heated to 70° F., the heat will be stored at a higher temperature level whereas, if the house is to be cooled to 75° F., the heat will be discharged to and stored at a lower temperature level.

Figure 1:
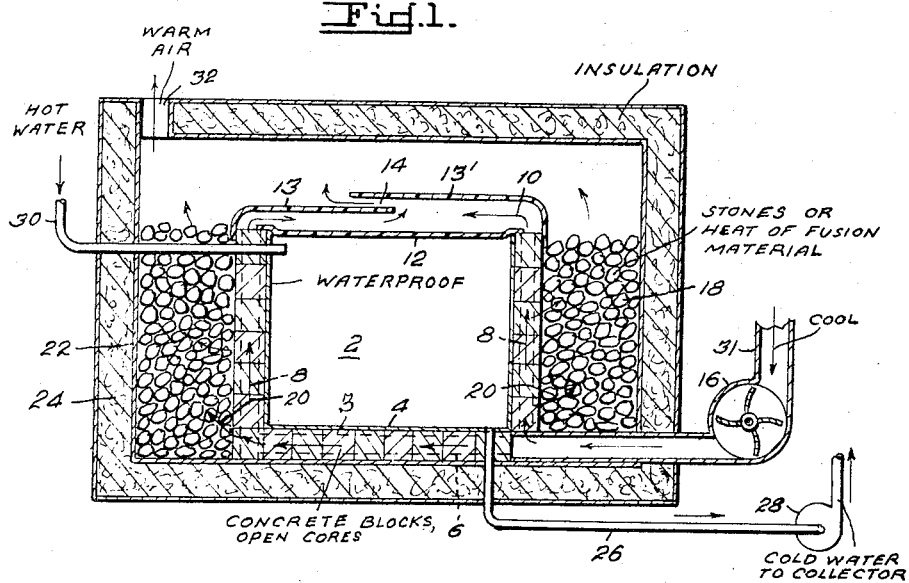
FIG. 1 is a diagrammatic cross sectional view through one form of the invention.

In FIG. 1 a water tank 2 comprises masonry such as concrete building blocks, bricks or such at 3. The masonry is waterproofed at surface 4. Air passages 6 provide for circulation of air through the masonry material of the tank itself. Air currents are illustrated at 8 passing in heat exchange relationship with the masonry 3. The masonry, in turn, transfers heat to, or from, the liquid in the tank.

As the air passes out through the top of the masonry tank walls it is preferably diverted across the top of the tank as illustrated at 10.

The top of the tank may be closed by a liquid and vapor resistant member 12 which floats or is otherwise suspended or supported over the liquid. Members 13, 13' serve to deflect the air in tortuous paths across top member 12 to effect a better heat exchange relationship. The air passes out between members 13, 13' at 14. When blower 16 is turned off, and air is no longer introduced under pressure, member 13' settles down onto member 13 thereby closing passage 14 and reducing convection currents. Members 12, 13 and 13' are preferably flexible plastic film, with 13, 13' serving as a flap valve at 14.

Stones, containers of heat-of-fusion material, or other heat storage and heat exchanger material 18, may be used around tank 2 if desired. If material 18 is used a portion of the air supplied by blower 16 may pass out of the masonry tank walls as at 20 and into material 18. Air currents 20 exchange heat with material 18 through which they flow.

The apparatus is preferably inclosed in an airtight storage bin 22 with insulation 24 substantially surrounding the bin.

Liquid to be heated may be withdrawn from tank 2 through pipe 26 and circulated to a solar heat collector or other source of heat by pump 28. Hot liquid is returned to tank 2 by pipe 30.

Air is drawn from an area to be heated through duct 31 by blower 16. The air is warmed as it passes through the warm bin and passes out through duct 32 back to the area to be heated.

If desired the liquid in tank 2 may be cooled, at night on hot summer days for example, to cool the air passing through the bin. The cooled liquid cools the masonry walls of the tank, and adjacent material 18 if such is used, thereby storing "coolness." This storage of heat at a low level is useful for summertime air conditioning.

Figure 2:
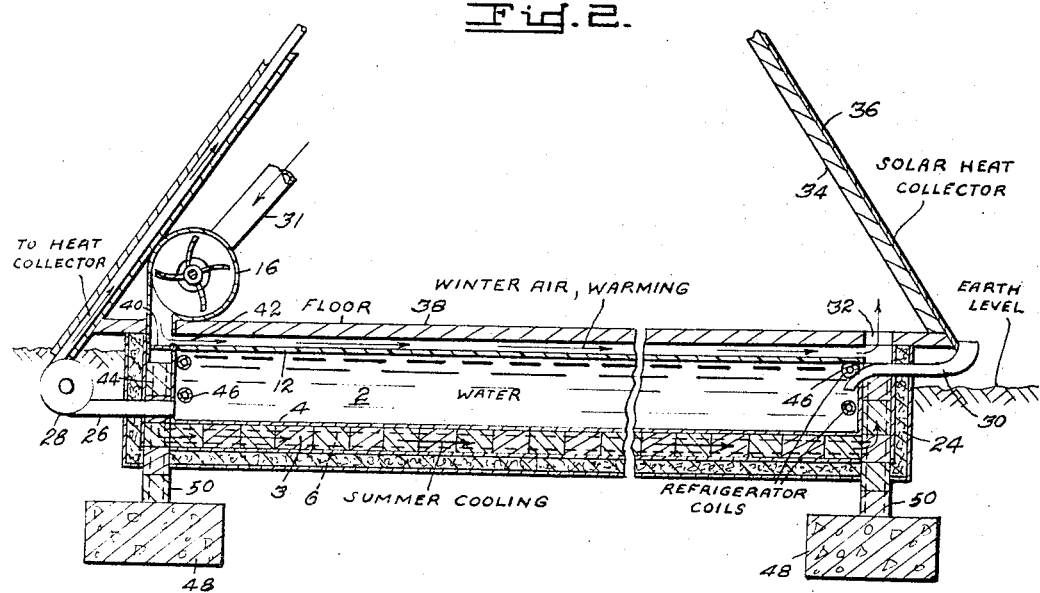
FIG. 2 is a view through a "pancake" modification of storage apparatus.

In FIG. 2 "pancake" heat or "cold" storage apparatus is illustrated for warming or cooling a chalet style or A-frame house 34 with a solar heat collector 36 and floor 38, preferably well insulated to reduce heat losses up from the heat bin. The masonry tank walls 3 have air passages 6 therethrough for passage of air to be cooled when damper 40 is swung up to block passage 42 and passage 44 is open. This directs the air adjacent to the relatively cold bottom of the heat bin for maximum cooling. The cool air, drawn from the interior through duct 31 by blower 16, is returned at 32 to cool the interior of the house.

During the heating season damper 40 is swung to close passage 44 and to open passage 42 as the air flows through the storage bin. Air then flows from blower 16 along the warm top 12 of tank 2 and the warmed air is returned through passage 32 to warm the interior of the building.

It will be noted that only one valve is used to switch the air flow from winter heating to summer cooling.

Refrigeration coils 46, or rooftop cooling as taught in Thomason Patent No. 3,254,703, or other means, may be used to cool the water in tank 2.

The house is customarily supported on footings 48 and foundation walls 50.

The "pancake" form of heat storage apparatus could be used in other environments. As exemplary, it could be used between the ceiling of one level of living quarters and the floor of a higher level.

The heat or "cold" storage tank and bin described is simple and low-cost to construct, even in large sizes, therefore, large capacity can be obtained at low cost. Also, large heat exchange surfaces are provided between the liquid and solid material and between the solid material and air. This permits use of heat stored at a temperature level near the temperature to be maintained in the space to be heated or cooled. This, in turn, increases efficiency of solar heat collection for heating or heat dissipation for cooling. The materials used for construction are permanent and non-corrosive in nature thereby yielding a long life for the apparatus.

For the "pancake" design excavation costs are substantially eliminated and storage bin costs are reduced to a minimum. Further, the entire floor is kept warm in winter and cool in summer to aid in comfort-conditioning the house.

In the "pancake" type the tank is relatively shallow but is long and wide, thereby providing a large area of surface 12. The masonry, stone and sand material could be eliminated. The air to be heated is flowed in the thin space across the large top of the tank 12 and below floor 38. In all forms of the invention the top 12 is preferably made of a heat conducting and vapor barrier material which minimizes evaporation of the liquid while transferring heat to the air flowing thereover. Due to the large area of the tank top, and by confining air flow to rather thin proportions, good heat exchange can be obtained between the liquid and air. This is all the more true where the apparatus is used for storage, and recovery, of heat because the warmer liquid rises to the top of the tank to keep top 12 warm. Also, no insulation is perfect and therefore warmth from the entire top of the tank rises and helps warm the entire floor thereabove.

I claim:
1. Apparatus for storing heat at a temperature level higher or lower than ambient temperatures comprising a liquid tank, said liquid tank comprising masonry material, said liquid tank being substantially liquid and vapor tight adjacent to its inner surface, passage means for circulation of air through said masonry material in heat exchange relationship therewith and additional material for storing heat adjacent to said masonry material, and additional passage means for circulation of air out from said masonry material into said additional material.

2. Apparatus as in claim 1 wherein said additional material comprises stone-like material.

3. Apparatus as in claim 1 wherein said additional material comprises heat-of-fusion storage material.

4. Apparatus for storing heat at a temperature level higher or lower than ambient comprising a heat storage bin, insulation means for said bin, a masonry tank in said bin, waterproof means inside of said tank, passage means for movement of air through said masonry in heat exchange relationship therewith, means to introduce air to said passage means for conditioning of said air, and passage means for flowing conditioned air from said bin.

5. Apparatus as in claim 4 and, additional material adadjacent to said masonry tank, and additional passage means for circulation of air out from said masonry material into said additional material.

6. Apparatus as in claim 4 and, a cover material over said tank, and means to deflect air across said cover in tortuous paths.

7. Apparatus as in claim 4 and, means to selectively flow air over said tank or through said masonry material.

8. Apparatus for storing heat at a temperature level higher or lower than ambient temperatures comprising a "pancake" liquid tank having a relatively shallow depth and a long and wide upper surface, heat conducting-vapor barrier means covering said tank and in contact with the liquid therein to reduce evaporation of the liquid while transferring heat to or from the air above said tank, and means to circulate air in heat exchange relationship with said heat conducting-vapor barrier means.

9. Apparatus as in claim 8 and, insulation means beneath said tank.

10. Apparatus as in claim 8 and, confining means above said heat conducting-vapor barrier means confining air flow therebetween to relatively thin proportions to thereby enhance heat exchange between the air and barrier means.

11. Apparatus as in claim 10 wherein said confining means comprises a floor or floor supporting members for a space to be heated above said "pancake" liquid tank whereby heat rising from said tank helps warm the air and floor or supporting members above said tank.

12. Apparatus for storing heat at a temperature level higher or lower than ambient temperatures comprising a liquid tank, said liquid tank comprising masonry material, said liquid tank being substantially liquid and vapor tight adjacent to its inner surface, passage means for circulation of air through said masonry material in heat exchange relationship therewith, a cover across the top of said tank, and means to deflect at least a portion of the air across the cover.

13. Apparatus for storing heat at a temperature level higher or lower than ambient temperatures comprising a liquid tank, said liquid tank comprising masonry material, said liquid tank being substantially liquid and vapor tight adjacent to its inner surface, passage means for circulation of air through said masonry material in heat exchange relationship therewith, a cover over said tank, and deflection means to deflect air across the cover, said deflection means including valve means to automatically close when the pressure of air being so deflected is lowered to a predetermined value.

14. Apparatus for storing heat at a temperature level higher or lower than ambient temperatures comprising a liquid tank, said liquid tank comprising masonry material, said liquid tank being substantially liquid and vapor tight adjacent to its inner surface, passage means for circulation of air through said masonry material in heat exchange relationship therewith, a cover over said tank, and means to selectively pass air over said cover or through said masonry material.

References Cited
UNITED STATES PATENTS

| | | | |
|---|---|---|---|
| 2,060,636 | 11/1936 | Persons | 165—18 |
| 2,430,890 | 11/1947 | Schneible | 126—101 X |
| 2,484,127 | 10/1949 | Stelzer. | |
| 2,559,869 | 7/1951 | Gay | 126—270 X |
| 3,103,575 | 9/1963 | Pecci | 126—101 X |

FOREIGN PATENTS 495,491  11/1938  Great Britain.

CHARLES J. MYHRE, *Primary Examiner.*